(12) United States Patent
Boulton

(10) Patent No.: US 11,636,211 B2
(45) Date of Patent: Apr. 25, 2023

(54) BINARY STATIC ANALYSIS OF APPLICATION STRUCTURE TO IDENTIFY VULNERABILITIES

(71) Applicant: BlackBerry Limited, Waterloo (CA)

(72) Inventor: Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 496 days.

(21) Appl. No.: 16/454,256

(22) Filed: Jun. 27, 2019

(65) Prior Publication Data

US 2020/0410107 A1     Dec. 31, 2020

(51) Int. Cl.
*G06F 21/57*     (2013.01)

(52) U.S. Cl.
CPC ...... *G06F 21/577* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 7,137,108 B1 * | 11/2006 | Kumhyr | | G06F 8/425 |
| | | | | 717/142 |
| 9,465,942 B1 * | 10/2016 | Kane-Parry | | G06F 21/57 |
| 2002/0073330 A1 * | 6/2002 | Chandnani | | G06F 21/563 |
| | | | | 726/26 |
| 2013/0152045 A1 * | 6/2013 | Jain | | G06F 9/454 |
| | | | | 717/120 |
| 2013/0247207 A1 * | 9/2013 | Hugard, IV | | H04L 63/1433 |
| | | | | 726/25 |
| 2015/0379023 A1 * | 12/2015 | Shabtay | | G06F 16/116 |
| | | | | 707/756 |
| 2016/0259943 A1 | 9/2016 | Murthy et al. | | |
| 2017/0220806 A1 * | 8/2017 | Munoz | | G06F 21/577 |
| 2018/0293517 A1 * | 10/2018 | Browne | | G06N 5/04 |
| 2020/0349259 A1 * | 11/2020 | Tsai | | G06F 21/562 |

FOREIGN PATENT DOCUMENTS

WO     2008047351 A2     4/2008

OTHER PUBLICATIONS

EPO: Extended European Search Report relating to EP application No. 20175877.8, dated Oct. 19, 2020.

* cited by examiner

*Primary Examiner* — Fatoumata Traore
(74) *Attorney, Agent, or Firm* — Rowand LLP

(57) ABSTRACT

Described are methods and devices to identify vulnerabilities in a software package that includes two or more build files. The build files include at least an application file and one or more resource files. The method includes scanning the build files to identify strings. Strings that appear in one of the resource files and are not referenced in the application file are labelled orphaned. Strings that appear in the application file and are node defined in any of the resources files are labelled hardcoded. The identity of hardcoded and orphaned strings is output as potential vulnerabilities or data leakage points.

32 Claims, 3 Drawing Sheets

BINARY STATIC ANALYSIS OF APPLICATION STRUCTURE TO IDENTIFY VULNERABILITIES

FIELD

The present application generally relates to software vulnerabilities and, in particular, to devices and methods for identifying software vulnerabilities in pre-release software.

BACKGROUND

Modern software is often large and complex. The size and complexity, along with the staged development and testing, can sometimes lead to vulnerabilities in a final software build. In many cases, a complex software package may include code developed by a number of different vendors. Poorly-designed software that does not reflect best practices in software design may make maintenance and patching more difficult. The staged development of software packages may also lead to vulnerabilities in terms of data leakage; that is, exposure of information that was not intended to be public.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
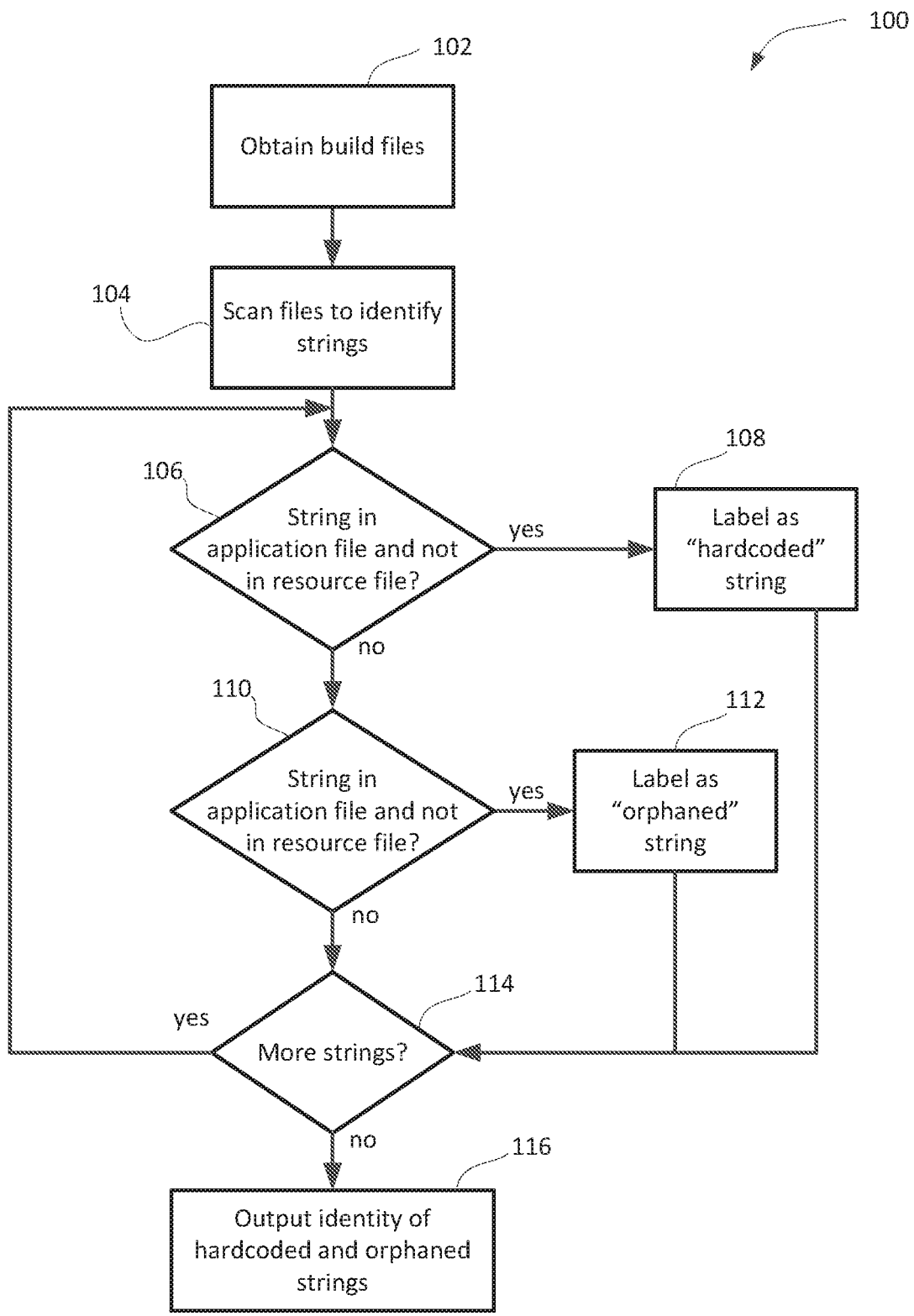
FIG. 1 shows, in flowchart form, one example method of identifying vulnerabilities in a software package.

The present application describes one or more methods and devices to identify vulnerabilities in a software package. The package includes build files, which include at least an application file and one or more resource files. The method includes scanning the build files to identify strings. Strings that appear in one of the resource files and are not referenced in the application file are labelled orphaned. Strings that appear in the application file and are node defined in any of the resources files are labelled hardcoded. The identity of hardcoded and orphaned strings is output as potential vulnerabilities or data leakage points.

In one aspect, the present application describes a method of identifying vulnerabilities in a software package that includes two or more build files, the build files including at least an application file and one or more resource files. The method may include scanning the build files to identify strings; labelling at least one of the identified strings as an orphaned string based on it appearing in one of the resource files and it not being referenced in the application file; labelling at least one of the identified strings as a hardcoded string based on it appearing in the application file and not in any of the resource files; and outputting the identity of the orphaned strings and the hardcoded strings.

In some implementations, the method may further include classifying the identified strings and wherein outputting includes displaying at least some of the identified strings grouped by classification. In some such implementations, classifications include at least one of uniform resource locators, email addresses, IP addresses, passphrases, or usernames.

In some implementations, the outputting includes outputting a graphical user interface display containing respective lists of the orphaned strings and the hardcoded strings.

In some implementations, the method may further include determining a build quality score for the software package. In some such implementations, determining the build quality score includes determining the build quality score based on a count of orphaned strings and hardcoded strings. In some such implementations, determining the build quality score is based on the count relative to a total string count or to a total size of the build files.

In some implementations, the application file may define components and their interaction and the resource files contain definitions. The resource files may include a string.xml file.

In some implementations, the method may further include first determining that a platform on which the software package is based supports separation of concerns design principles.

In another aspect, the present application describes a computing device for identifying vulnerabilities in a software package that includes two or more build files, the build files including at least an application file and one or more resource files. The computing device may include one or more processors; memory storing the build files; and a software vulnerability analysis application stored in memory. The application may contain instructions that, when executed by the one or more processors, are to cause the processors to scan the build files to identify strings, label at least one of the identified strings as an orphaned string based on it appearing in one of the resource files and it not being referenced in the application file, label at least one of the identified strings as a hardcoded string based on it appearing in the application file and not in any of the resource files, and output the identity of the orphaned strings and the hardcoded strings.

In yet a further aspect, the present application describes non-transitory computer-readable media storing computer-executable program instructions which, when executed, cause one or more processors to perform the described methods.

Other aspects and features of the present application will be understood by those of ordinary skill in the art from a review of the following description of examples in conjunction with the accompanying figures.

Any feature described in relation to one aspect or embodiment of the invention may also be used in respect of one or more other aspects/embodiments. These and other aspects of the present invention will be apparent from, and elucidated with reference to, the embodiments described herein.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Modern software is often large and complex. The size and complexity, along with the staged development and testing, can sometimes lead to vulnerabilities in a final software build. In many cases, a complex build incorporates portions developed by different vendors. The quality of the software development may vary among vendors. It is a daunting task for a software developer to ensure that its final customer-ready product does not inadvertently contain vulnerabilities, such as the exposure of information or development details that should not be public, particularly if that software incorporates code from a number of different vendors. Moreover, poorly-designed software that does not conform to best practices in software development may make maintenance and patching more difficult.

Accordingly, it would be advantageous to have a computer automatically scan all the files of release-ready code, e.g. build files, to identify potential issues and permit revision or redesign prior to general release. One possible option is to unpackage a build to obtain an application file or files and one or more resource files, and to scan all the files to identify strings. The identified strings may then be listed and software developer may then manually review the list in hopes of noticing any suspicious strings. However, in any sizable software package this would result in a huge list of strings. Most strings are benign and perfectly suitable. Manual review would be costly in terms of time and likely to result in missed vulnerabilities due to human error.

Most modern software development follows a "separation of concerns" (SoC) principle. The SoC principle effectively promotes abstraction and layered design that results in "modular" programs where discrete functions or tasks are carried out by discrete sections or portion of code and those functions or tasks are referenced by other portions of code when those functions or tasks are needed. Likewise, labels, text information, icons, and other details of presentation or implementation are abstracted out of the main program and put in reference files or other associated files. This enables easy updates for changes, such as to alter language or layout. In a program that embodies SoC principles, most details are not hardcoded into an application file.

Certain software languages and development platforms are designed to enable SoC whereas some are not. For example, the Android™ operating system and its associated software development kit (SDK) supports SoC design principles. Applications running on Android™ may, for example, use Java and C++ programming languages, each of which supports SoC. Languages that are well designed to support SoC are often those classed as "object-oriented", "service-oriented" or "aspect-oriented" languages. Conversely, some platforms or programming languages, typically older languages like C, Pascal or Fortran, may not so easily support SoC principles. These languages are typically procedural languages.

In one example, a build that complies with the SoC principle will include at least one application file and one or more resource files. The resource files contain specifics and definitions, such as specific strings for display, specific URLs to be accessed, specific layout details or parameters for a screen size, specific labels for user interface elements, etc. In one example, a resource file is a non-executable data file that is used by an application file. For example, it can include one or more string resources that can be null-terminated Unicode or ASCII strings. Usually, when an application is executed (from the application file), it loads the one or more string resources. The file extension of a resource file is linked to the programming language used for creating the application. For example, a resource file associated with an ASP.NET application uses the .resx extension and is in XML format. The application file may contain higher level organization of components and their interaction. It will make reference to generically named parameters, variables, etc., for which the resource files supply the actual string, URL, parameter, label, etc. In some cases, the resource files include multiple alternatives for a generically named parameter to account of various device configurations possibilities.

Accordingly, an application file is intended to be executed, and relies on a resource file for getting and/or substituting values associated with strings. An application file may be a binary file (such as an executable program), or an assembly code file, or a source code file. As an example, in the case of an Android™-based device, the application file may be a DEX file, or in the case of a Linux-based device, the application file may be an ELF file.

In accordance with one aspect of the present application, a build may be automatically analyzed to identify potential vulnerabilities. In particular, a computing device may unpackage a build to obtain an application file and resource files and may scan those files to identify potential vulnerabilities. In one example, a vulnerability may include a string that is hardcoded in the application file instead of being defined in a resource file and referenced in the application file. In another example, a vulnerability may include a string that is orphaned by being included in the resource file but never referenced in the application file. Either case may indicate a string that was inadvertently either hardcoded or orphaned during the development process. Such strings may indicate poor design that could lead to software update or patching challenges in the future and/or may indicate potential leakage of data from earlier development stages that is not intended for public availability. Results from the analysis may be output, for example to a display screen, and may highlight strings identified as hardcoded or orphaned. In some implementations, a measurement of build quality may be determined or scored and presented.

Many of the examples herein refer to identifying "strings". The term "string" in this application refers to alphanumeric text within the code. In some cases a "string" may be intended for output in a message, display, or other user interface. In some cases, a "string" may be an internal label assigned to a variable or parameter within the code. In some cases, a "string" may be a parameter that is passed to a process as an argument, for example. Strings may include, for example, labels for variables, parameter names, labels for input fields or buttons, GUI elements, text output, URLs, email addresses, passphrases, etc. Those ordinarily skilled in the art will be familiar with the mechanisms for scanning files and identifying strings and the various algorithms that may be used identify certain categories of strings. In some implementations, a string can be a sequence of characters associated with data or values. Examples of "strings" include ASCII and UTF-8 character sequences. In some examples, the sequence may need to be at or above a minimum length to qualify as a string. Examples include two characters, three characters, four characters, or more.

In some implementations, the computing device may be operated by the software developer for analyzing its pre-release software builds. In some other implementations, the computing device may be operated by a service provider that offers to analyze pre-release software builds for software developers. In the latter case, the software developer may cause a build to be uploaded to a server operated by the service provider to have its build analyzed and the results may then be provided to the software developer.

Reference is now made to FIG. 1, which shows, in flowchart form, one example method 100 for identifying potential vulnerabilities in a software build. The method 100 is carried out by a computing device that obtains, in operation 102, build files for a software build. The build files may be uploaded or transmitted to the computing device. Obtaining the files may include unpackaging, decrypting, unzipping or otherwise extracting the files from a software container or package in which they are provided. The build files include at least one application file and one or more resource files. In general, the application file contains operational flow instructions and references the resource files. The resource files may include files of various types, but generally they provide specifics of an implementation. For example, a resource file may include specific labels, text, or values that are mapped to more generic references that are used by the application file. To use Android™ as an example, a manifest file will declare the components of an application and various features and permissions required for the application. The components may include activities, services, broadcast receivers and content providers. However, all the details of the visual presentation, including icons, images, audio, video, menus, layout, text, etc., are all defined in xml resource files grouped in a res/directory. Within that general resources directory are a set of subdirectories for various things, such as values, layout, font, menu, etc. Those subdirectories may hold various resources files. For example, the values subdirectory may hold a strings.xml file.

In operation 104 the computing device scans the files to identify strings. In one example, when the application file is a binary file, a reverse engineering program (such as IDA Pro, etc.) may be used for identifying strings.

Operations 106 to 114 involve assessing whether the identified strings include any "hardcoded" or "orphaned" strings. In this example, each string is evaluated in turn to see if it is hardcoded or orphaned, although this is just one example illustration and other procedures may be used to make the same assessment. In this example, in operation 106, the computing device assesses whether a string appears in the application file but not in any resource file. That is, the string is not a generic label that is further defined in a resource file, but instead is hardcoded in the application file. If so, then in operation 108 that string is identified, e.g. labelled, as a "hardcoded" string. This may include, for example, storing the string and details of its location in a list or other data structure for identified hardcoded strings.

In operation 110, the string is evaluated to see if it appears in a resource file but is not referenced in any application file. If so, then the string is identified, e.g. labelled, as an "orphaned" string in operation 112.

A hardcoded string is a potential vulnerability in that it is indicative of a lack of separation of concerns and may lead to future problems in maintaining or updating the application. An orphaned string is a potential vulnerability in that it may have been left in the files accidentally and may be left over from earlier development work, which could result in leak of development information or other data not meant for public access.

In operation 114, the computing device determines whether any more strings remain to be evaluated. If not, then in operation 116 the computing device outputs the identity of the identified hardcoded and orphaned strings. This may include displaying respective lists of the hardcoded strings and the orphaned strings. The display may include information on where the strings were located in the build files.

Figure 2:
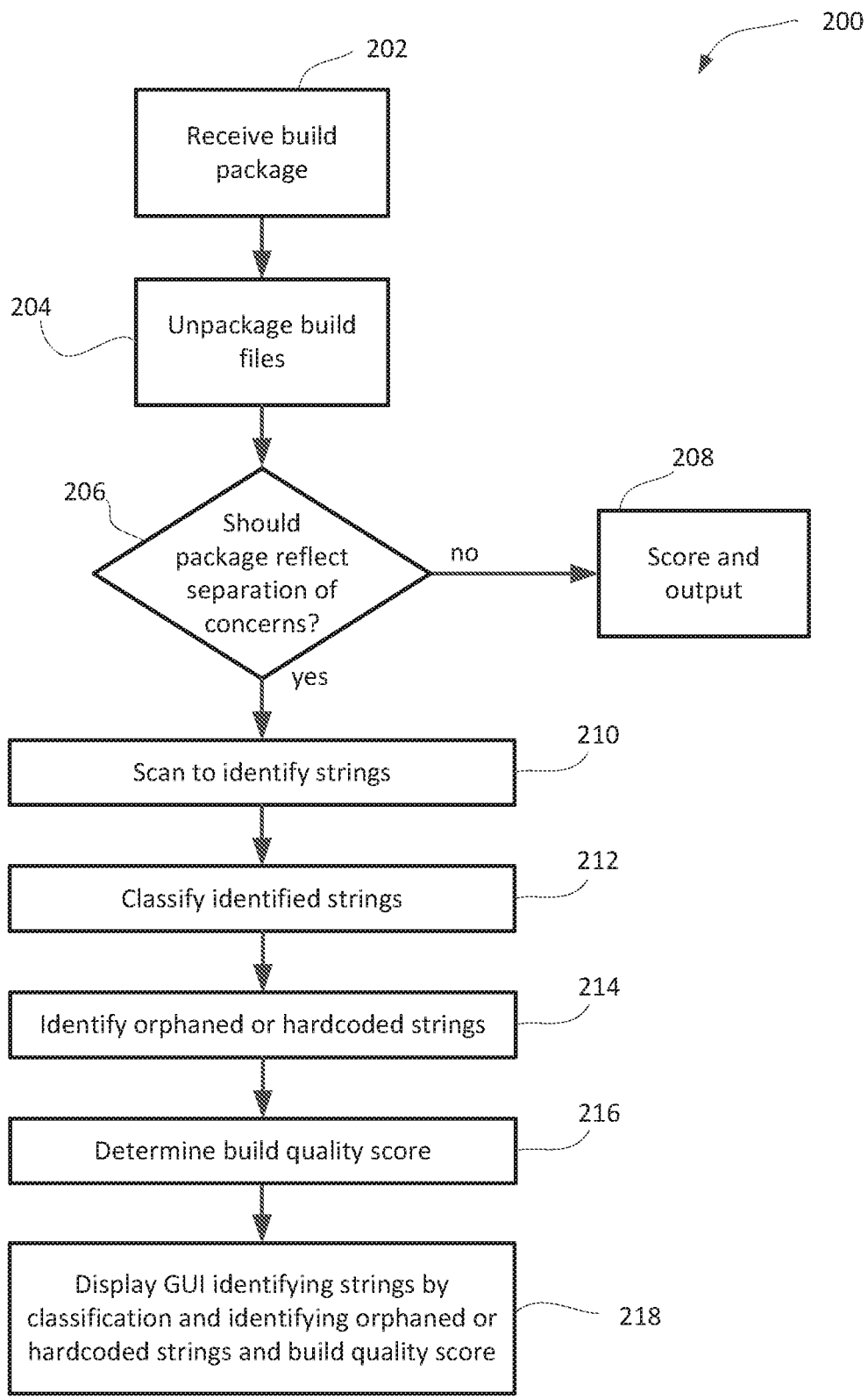
FIG. 2 shows, in flowchart form, another example method of identifying vulnerabilities and scoring the build quality of a software package.

FIG. 2 illustrates another example method 200 of identifying vulnerabilities in a software package. In operation 202, the build package is received by a computer system implementing the method 200. The computer system may receive the build package in any suitable manner, including through an electronic file transfer. The computer system may then need to unpackage the build files in operation 204, spending on the format in which the build package is received.

In this example method 200, in operation 206 the computer system assesses whether the build files are of a type that should reflect a separation of concerns. This assessment may be based, for example on the development platform, the operating system for which the build files are designed, the programming language used, or any other set of factors that may contribute to an assessment of whether the build files are of a class that SoC would indicate high quality design. If not, then the method 200 might not be suitable for assessing the build files, and the software package may be scored accordingly and the method 200 may end.

Alternatively or additionally, in operation 206, the computer system may assess whether the structure of the build files is such that they appear to reflect SoC in their overall organization. That is, the computer system may evaluate whether the manifest file or other equivalent programming structure indicates a general SoC design to the software package. If not, then the software package may be scored accordingly in operation 208.

Operation 206 may additionally or alternatively include assessing the size of the software package. This may include counting the number of files and their respective sizes. It may further include assessing whether any of the files is not used or referenced by any of the other files. In one embodiment, this information may be displayed in operation 218, which is described further below.

Assuming that the computer system determines that the method 200 should continue in operation 206, then in operation 210 the build files are scanned to identify strings and in operation 212 the strings may be classified. The classification may include identifying certain categories of strings for additional analysis or to be grouped for output later as potential vulnerabilities for review. For example, some illustrative classes may include strings that appear to be uniform resource locators (URLs), email addresses, passphrases, usernames, IP addresses, or other potentially sensitive data that may originate from earlier development work and that might not have been intended for public release. Certain classes of these strings may be of potential higher risk than others. By classifying them, review of their suitability is facilitated without the clutter of a large number of innocuous strings.

In operation 214, the computer system may identify orphaned or hardcoded strings, as discussed above.

In operation 216, in this example, the computer system may determine a build quality score for the software package. The build quality may be determined as a measure of various factors, including those relating to SoC. For example, a build quality score may include determining a count of orphaned or hardcoded strings, where a higher count results in a lower build quality score. The count may be relative to the overall count of strings in the build package, or may be relative of the collective size of the build files in some cases. The score may be based on the count exceeding certain thresholds. In some cases, the impact of a hardcoded or orphaned string on the build quality score may depend on the class into which the string falls. That is, if the string is categorized as being in one of the potential high risk classes, such as URLs, email addresses, passphrases, IP addresses, etc., then that hardcoded or orphaned string may have a larger negative impact on build quality scoring than a hardcoded or orphaned string from a more benign class.

The score and other data regarding the assessment of build quality may be displayed in operation 218. In some examples, a graphical user interface (GUI) display may provide the build quality score and an interface permitting a use to browse through the categories of strings and the respective lists of orphaned or hardcoded strings. In some cases, links may be provided to enable selection of the one of the listed strings that may result in further display of a portion of the file in which the string appears or is defined. For example, selection of an orphaned string may result in display of that portion of the relevant resource file in which the string is found. Selection of a hardcoded string may result in display of that portion of the relevant application file in which the string is hardcoded.

In some cases, the GUI may allow for a user to flag individual strings as vulnerabilities requiring follow up or correction. In some cases, the GUI may allow for a user to flag individual strings as benign requiring no follow up or correction. A further output may be generated, by message or other communication, that indicates elements of the build package requiring correction. The build quality score may also be indicated.

Figure 3:
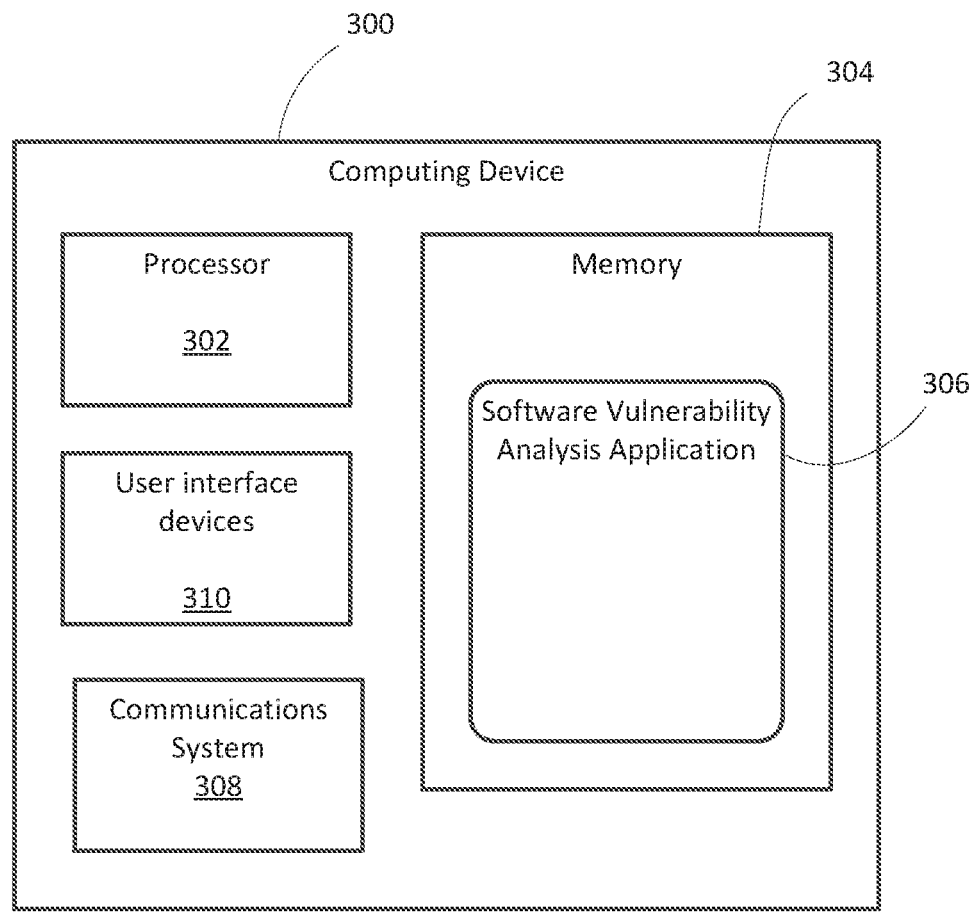
FIG. 3 shows, in block diagram form, one simplified example of a computing device for identifying vulnerabilities in a software package.

Reference is now made to FIG. 3, which shows, in block diagram form, one simplified example of a computing device 300 for identifying vulnerabilities in software packages. The computing device 300 may include one or more processors 302 and memory 304. The computing device 300 may include an operating system stored in memory and executable by the processors 302 to carry out basic device functions and to provide a platform for execution of application software.

The memory 304 may include persistent data storage and temporary data storage. The memory 304 may include a software vulnerability analysis application 306 that, when executed by the one or more processors 302, causes the processors 302 to carry out the operations described herein. The memory 304 may further include the software package and/or build files that are to be subjected to analysis.

User interface devices 310 may include a display and/or one or more user input devices, such as a keyboard, mouse, touchscreen, etc.

The computing device 300 may also include a communications system 308 providing network connectivity to enable the sending and receiving of data with remote devices. In some cases, the communications system 308 may provide for Internet connectivity, whether through wired connection, wireless connection, or both.

It will be appreciated that the computer system or device according to the present application may be implemented by a number of computing devices, including, without limitation, servers, suitably-programmed general purpose computers, machine vision systems, and mobile devices. The described methods may be implemented in software containing instructions for configuring a processor or processors to carry out the functions described herein. The software instructions may be stored on any suitable non-transitory computer-readable memory, including CDs, RAM, ROM, Flash memory, etc.

It will be understood that the computer system or device described herein and the module, routine, process, thread, or other software component implementing the described method/process for configuring the computer system or device may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of detecting vulnerabilities in a software package that includes two or more build files, the method comprising:
   receiving electronic transmission of the software package at a computing device;
   unpackaging, by the computing device, the software package to extract the two or more build files including an application file and one or more resource files;
   scanning, by the computing device, the build files to identify strings and based on that scanning
      labelling at least one of the identified strings as an orphaned string based on it appearing in one of the resource files and it not being referenced in the application file by:
         identifying said at least one of the identified strings in said one of the resource files, and
         scanning the application file for said at least one of the identified strings and determining that no match appears in the application file, and
      labelling at least one of the identified strings as a hardcoded string based on it appearing in the application file and not in any of the resource files; and
   outputting the detected vulnerabilities in the software package by displaying a graphical user interface containing respective lists of the orphaned strings and the hardcoded strings.

2. The method claimed in claim 1, further comprising classifying the identified strings and wherein displaying includes displaying at least some of the identified strings grouped by classification.

3. The method claimed in claim 2, wherein classifications include at least one of uniform resource locators, email addresses, IP addresses, passphrases, or usernames.

4. The method claimed in claim 1, further comprising determining a build quality score for the software package.

5. The method claimed in claim 4, wherein determining the build quality score includes determining the build quality score based on a count of orphaned strings and hardcoded strings.

6. The method claimed in claim 5, wherein determining the build quality score is based on the count relative to a total string count or to a total size of the build files.

7. The method claimed in claim 1, wherein the application file defines components and their interaction and the resource files contain definitions.

8. The method claimed in claim 7, wherein the resource files include a string.xml file.

9. The method claimed in claim 1, further comprising first determining that a platform on which the software package is based supports separation of concerns design principles.

10. The method of claim 1, wherein labelling at least one of the identified strings as a hardcoded string includes:

identifying said at least one of the identified strings in the application file; and scanning the resource files for said at least one of the identified strings and determining that no match appears in the resource files.

11. A computing device for detecting vulnerabilities in a software package that includes two or more build files, the computing device comprising:

one or more processors;
a display;
memory storing the software package; and
a software vulnerability analysis application stored in memory and containing instructions that, when executed by the one or more processors, are to cause the processors to:

receive electronic transmission of the software package at the computing device, unpackage, by the computing device, the software package to extract the two or more build files including an application file and one or more resource files, scan, by the computing device, the build files to identify strings, and based on that scan, label at least one of the identified strings as an orphaned string based on it appearing in one of the resource files and it not being referenced in the application file by:

identifying said at least one of the identified strings in said one of the resource files; and scanning the application file for said at least one of the identified strings and determining that no match appears in the application file, and label at least one of the identified strings as a hardcoded string based on it appearing in the application file and not in any of the resource files, and output the detected vulnerabilities in the software package by displaying on the display a graphical user interface containing respective lists of the orphaned strings and the hardcoded strings.

12. The computing device claimed in claim 11, wherein the instructions, when executed, are to further cause the processors to classify the identified strings and wherein displaying includes displaying at least some of the identified strings grouped by classification.

13. The computing device claimed in claim 12, wherein classifications include at least one of uniform resource locators, email addresses, IP addresses, passphrases, or usernames.

14. The computing device claimed in claim 11, wherein the instructions, when executed, are to further cause the processors to determine a build quality score for the software package.

15. The computing device claimed in claim 14, wherein determining the build quality score includes determining the build quality score based on a count of orphaned strings and hardcoded strings.

16. The computing device claimed in claim 15, wherein determining the build quality score is based on the count relative to a total string count or to a total size of the build files.

17. The computing device claimed in claim 11, wherein the application file defines components and their interaction and the resource files contain definitions.

18. The computing device claimed in claim 17, wherein the resource files include a string.xml file.

19. The computing device claimed in claim 11, wherein the instructions, when executed, are to further cause the processors to first determine that a platform on which the software package is based supports separation of concerns design principles.

20. The computing device claim in claim 11, wherein the instructions, when executed, are to further cause the processors to label at least one of the identified strings as a hardcoded string by:

identifying said at least one of the identified strings in the application file; and scanning the resource files for said at least one of the identified strings and determining that no match appears in the resource files.

21. A method of detecting vulnerabilities in a software package that includes two or more build files, the method comprising:

receiving electronic transmission of the software package at a computing device;

unpackaging, by the computing device, the software package to extract the two or more build files including an application file and one or more resource files;

scanning, by the computing device, the build files to identify strings and based on that scanning labelling at least one of the identified strings as an orphaned string based on it appearing in one of the resource files and it not being referenced in the application file, and labelling at least one of the identified strings as a hardcoded string based on it appearing in the application file and not in any of the resource files by:

identifying said at least one of the identified strings in the application file; and scanning the resource files for said at least one of the identified strings and determining that no match appears in the resource files; and outputting the detected vulnerabilities in the software package by displaying a graphical user interface containing respective lists of the orphaned strings and the hardcoded strings.

22. The method claimed in claim 21, further comprising classifying the identified strings and wherein displaying includes displaying at least some of the identified strings grouped by classification, and wherein classifications include at least one of uniform resource locators, email addresses, IP addresses, passphrases, or usernames.

23. The method claimed in claim 21, further comprising determining a build quality score for the software package and wherein determining the build quality score includes determining the build quality score based on a count of orphaned strings and hardcoded strings.

24. The method claimed in claim 23, wherein determining the build quality score is based on the count relative to a total string count or to a total size of the build files.

25. The method claimed in claim 21, further comprising first determining that a platform on which the software package is based supports separation of concerns design principles.

26. The method claimed in claim 21, wherein labelling at least one of the identified strings as an orphaned string includes:

identifying said at least one of the identified strings in said one of the resource files; and scanning the application file for said at least one of the identified strings and determining that no match appears in the application file.

27. A computing device for detecting vulnerabilities in a software package that includes two or more build files, the computing device comprising:

one or more processors;
a display;
memory storing the software package; and
a software vulnerability analysis application stored in memory and containing instructions that, when executed by the one or more processors, are to cause the processors to:
  receive electronic transmission of the software package at the computing device,
  unpackage, by the computing device, the software package to extract the two or more build files including an application file and one or more resource files,
  scan, by the computing device, the build files to identify strings, and based on that scan,
    label at least one of the identified strings as an orphaned string based on it appearing in one of the resource files and it not being referenced in the application file, and
    label at least one of the identified strings as a hardcoded string based on it appearing in the application file and not in any of the resource files by:
      identifying said at least one of the identified strings in the application file; and
      scanning the resource files for said at least one of the identified strings and determining that no match appears in the resource files, and
  output the detected vulnerabilities in the software package by displaying on the display a graphical user interface containing respective lists of the orphaned strings and the hardcoded strings.

28. The computing device claimed in claim 27, wherein the instructions, when executed, are to further cause the processors to classify the identified strings and wherein displaying includes displaying at least some of the identified strings grouped by classification, and wherein classifications include at least one of uniform resource locators, email addresses, IP addresses, passphrases, or usernames.

29. The computing device claimed in claim 27, wherein the instructions, when executed, are to further cause the processors to determine a build quality score for the software package, and wherein determining the build quality score includes determining the build quality score based on a count of orphaned strings and hardcoded strings.

30. The computing device claimed in claim 29, wherein determining the build quality score is based on the count relative to a total string count or to a total size of the build files.

31. The computing device claimed in claim 27, wherein the instructions, when executed, are to further cause the processors to first determine that a platform on which the software package is based supports separation of concerns design principles.

32. The computing device claimed in claim 27, wherein the instructions, when executed, are to further cause the processors to label at least one of the identified strings as an orphaned string by:
  identifying said at least one of the identified strings in said one of the resource files; and
  scanning the application file for said at least one of the identified strings and determining that no match appears in the application file.

* * * * *